Dec. 30, 1969     T. A. WHATLEY     3,486,367
VAPOR GAP OSMOMETER
Filed Aug. 27, 1968
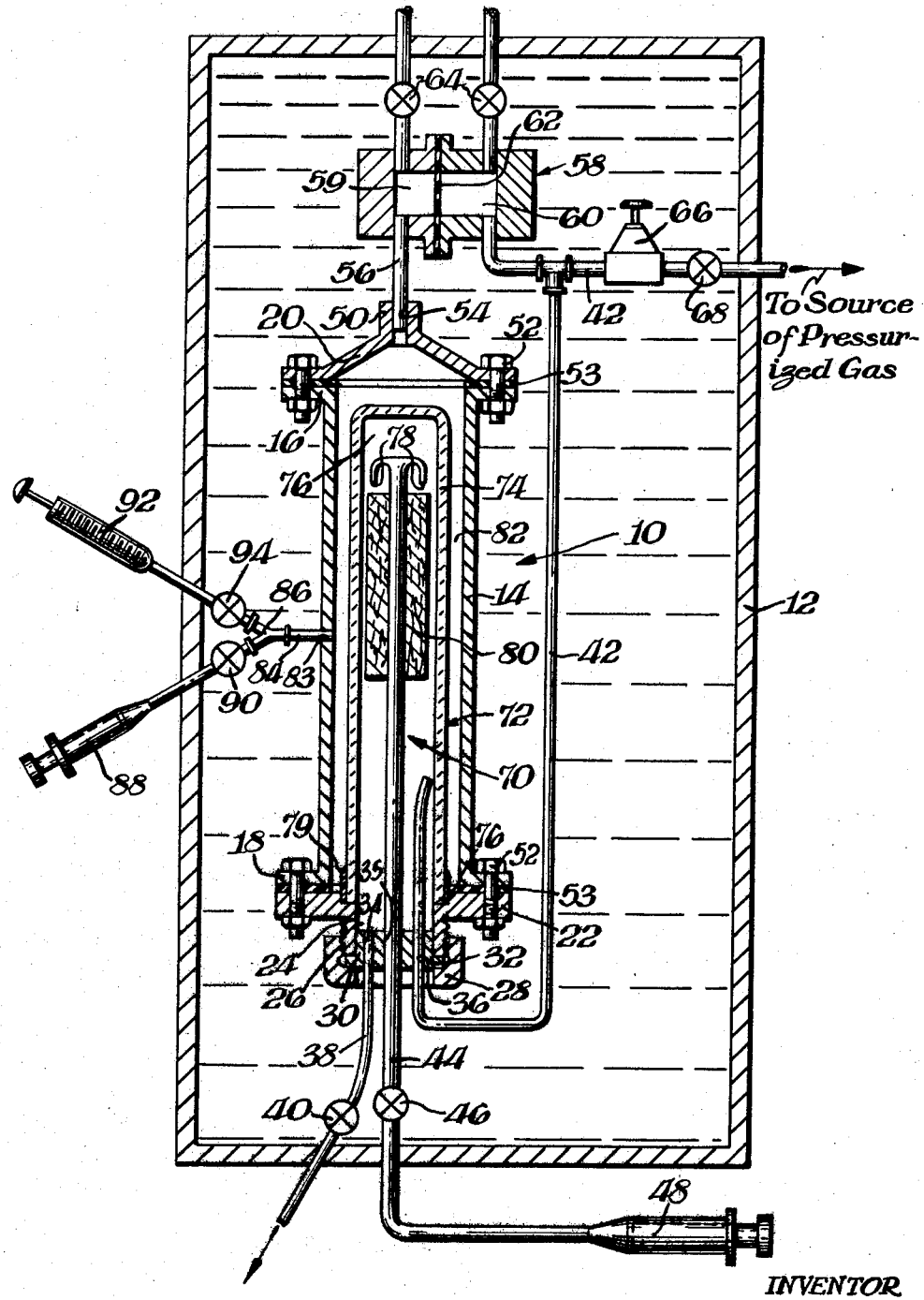
INVENTOR
Thomas A. Whatley
BY
Mortenson and Weigel
ATTORNEYS 3,486,367
VAPOR GAP OSMOMETER
Thomas A. Whatley, Northridge, Calif., assignor to Hewlett-Packard Company, Palo Alto, Calif., a corporation of California
Filed Aug. 27, 1968, Ser. No. 755,534
Int. Cl. G01n 11/10
U.S. Cl. 73—64.3                      6 Claims

ABSTRACT OF THE DISCLOSURE

A vapor gap osmometer is described in which a hollow cylindrical shell houses inner and outer annular chambers separated by a porous member. Solvent is introduced into the outer chamber. A sample wick is disposed along the axis of the inner chamber to receive the sample solution. The resulting annular space in the inner chamber between the sample wick and the porous member provides a vapor gap between the solvent and the sample material. The difference in pressure between the inner and outer chambers is sensed directly as an indication of osmotic pressure change caused by the sample. Means are provided to adjust the pressure in the inner chamber for operation above ambient pressure.

This invention relates to osmometers and, more particularly, to a more efficient, sensitive osmometer capable of determining molecular weights over a relatively wide range.

BACKGROUND OF THE INVENTION

Osmometers have been known for many years for various purposes including the determination of molecular weights of materials. They operate on the principle that when the non-volatile substance (solute) is dissolved in a liquid (solvent) it reduces the vapor pressure of the solvent. The degree of reduction of the vapor pressure of the solvent is a function of the number of molecules of dissolved solute. Any method that is a quantitative measure of the number of molecules in a sample can be used to determine the molecular weight. One needs only to know the weight of the sample since molecular weight is equal to the product of the sample weight times Avogadro's number divided by the number of molecules.

Many osmometers of the prior art have taken relatively long periods of time to operate. More recently feedback techniques have been employed to speed up the measurement. The pressure of the solvent is varied in accordance with the osmotic pressure exerted by the sample solution such that the pressure in the two chambers is equalized. The variation in pressure of the solvent is a measure of the vapor or osmotic pressure of the solution. Even these systems are limited since osmometers employing a semipermeable membrane are limited in their ability to handle wide ranges of molecular weights. Such ability is dependent upon the permeability of the particular membrane employed. For fractionated polymers and polymers of high molecular weight, osmometers provide a very useful tool. On the other hand, unfractionated polymers having a large number of low molecular weight molecules are subject to many errors. The small molecules tend to pass through the membrane and hence are not measured whereas the large molecules cannot pass and are measured.

Many of these deficiencies have been overcome to a large extent by the so-called vapor gap osmometer in which the membrane is replaced by the so-called vapor gap. In the vapor gap system, the solvent is able to pass to the solution only by passing through the vapor state. The passage of all non-volatile molecules, both of high and low molecular weight, is blocked. Unfortunately even vapor gap osmometers often are limited in application by low sensitivity and long required measuring times.

It is, therefore, an object of this invention to obviate many of the disadvantages inherent in the prior art osmometers.

Another object of this invention is to provide an improved low cost osmometer having a high degree of sensitivity.

SUMMARY

The osmometer of this invention includes a body member having first and second chambers therein. The chambers are separated by a common barrier formed by a porous member. An evaporating means is disposed in the first chamber and is adapted to receive a sample of a material in solution whose osmotic pressure is desired. A solvent (the same as used to form the solution) for the material is introduced into the second chamber. A pressure sensing means measures the difference in pressure between the first and second chambers. This difference in pressure is related to the osmotic pressure of the material.

In one preferred embodiment of the invention the pressure in the first chamber is increased above the ambient pressure to provide improved sensitivity. This increased pressure aids in compressing any trapped air bubbles. In another embodiment of the invention, the barrier between the two chambers is generally in the form of a hollow cylinder so as to provide a vapor gap having a greatly increased surface area.

DESCRIPTION OF THE DRAWING

The novel features of this invention which are considered characteristic are set forth with particularity in the appended claims. The invention, itself, however, both as to its organization and method of operation, as well as additional objects and advantages thereof, will best be understood from the following description when read in connection with the accompanying drawings, in which: the sole figure is a cross-sectional view of the instrument constructed in accordance with this invention.

DESCRIPTION OF THE PREFERRED EMBODIMENT

There is seen in the sole figure a housing or body member 10 in cross-section. The housing 10 is enclosed within a conventional constant temperature bath or oven 12 which maintains the temperature of the housing at a highly regulated adjustable temperature. Any suitable temperature bath or oven of known type may be used for this purpose.

The housing 10 consists essentially of four parts, beginning with a hollow cylindrical portion 14 having flanges 16 and 18 at either and thereof. The cylindrical portion 14 preferably is vertically disposed and is supported by any suitable clamp mechanism (not shown). The lower end of the cylinder 14 is closed by an end piece 22 which has a central orifice therein 24. The bottom face of the end piece 22 is raised in the vicinity of the orifice 24 to provide a nipple 26 to which may be threaded a cap nut 28. A plug 30 which may be formed of rubber or some other semi-resilient, inert material is generally cylindrical and adapted to be inserted into the central orifice 24. A flange on the lower portion of the plug 30 permits the plug to be seated within the orifice and acts, when the cap nut 28 is tightened, to seal the orifice.

Three openings or ports 34–36, inclusive, are formed axially through the plug 30. The first port 34 accommodates a conduit 38 which may have a valve 40 to permit the cavity within the body member to be drained as will be described. The second port 36 accommodates a pressure line or conduit 42 which permits an inert or other gas to be introduced into the housing 10 as will be described. The third port 35 accommodates a sample line or conduit 44 which permit the insertion of a sample material, whose osmotic pressure is to be determined, to be introduced into the housing 10. The sample line 44, as in the case for all of the conduits may be of stainless steel or similar tubing material, may have a valve 46 to permit the sample line to be closed. A syringe 48 is used to insert a desired volume of the sample material through the sample line 44. The syringe may be of any conventional type but for pressurized operation should be capable of providing relatively high pressures. All of the conduits up to and including the valves preferably should be enclosed within the oven 12.

The upper end of the housing 10 is closed by a conical shaped flange-like member 20 which performs the function of an upper end cap for sealing the housing to provide an air tight cavity or sample cell within the housing 10. The upper end cap 20 and the lower end piece 22 are both secured to the housing 10 as by bolts and nuts 52. Suitable sealing gaskets 53 may be placed between the mating flanged portions of the respective cylindrical portion 14 of the upper and lower end pieces 20 and 22, respectively, as may be desired. The apex 50 of the conical upper end cap 20 has a central orifice 54 to which a fluid line 56 may be coupled by any suitable means such as by a conventional tubing connector. The fluid line 56, as in the previous cases, may be stainless steel or other suitable conduit capable of withstanding high pressures up to and including pressure in excess of 100 per square inch (p.s.i.). The fluid line 56 connects the housing 14 with one side of a differential pressure transducer 58.

The differential pressure transducer 58 is of a conventional type having two chambers 59 and 60 which are illustrated schematically. These chambers 59, 60 are separated by a diaphragm 62 whose deflection is sensed to provide a differential output in the form of an electrical signal. Suitable bleed valves 64 are provided for the respective chambers 59 and 60 to permit, in this case, liquid to be bled from the left chamber 59 and gas to be bled from the right chamber 60. While any suitable differential pressure transducer can be employed, one suitable type which has been successfully employed is the Pace KP–15 sold by Pace Engineering Company, 13035 Saticoy St., North Hollywood, Calif. The gas side of the differential pressure transducer 58 is connected to the gas line 42. A T in the gas line 42 permits connection of the gas line through a pressure regulator 66 and valve 68 to a source of pressurized gas (not shown) which may for example be an inert gas such as helium. Any gas may be employed for this purpose so long as it is not chemically reactive either with the solvent, solute, or the materials employed in the osmometer.

The interior portion of the housing 10 is divided into inner and outer chambers 70 and 72, respectively, by a common barrier 74 which may be a permeable member preferably for the case of vapor gap osmometers, a porous frit. One such porous frit that has been employed successfully for this purpose is a ceramic frit tube made by Selas Flotronics, i.e., the "06" Grade Filter Candle which has a pore size of 0.3 micron and gives a bubble pressure with water of about 75 p.s.i. The porous barrier 74 is in the form of a hollow cylinder closed at the upper end and seated in a counterbore 76 formed in the center orifice 24 of the lower end piece 22 for that purpose. The lower portion of the barrier 74 may be painted with an epoxy 79 to render it non-porous and to permit it to be sealed for the desired pressurized operation. The sample conduit 44 terminates at its upper end with a discharge orifice 78 which in the preferred embodiment is in the form of a shower head design to permit fluid discharge in an annular ring about the periphery of the conduit 44. A sample wick 80 is placed over the sample conduit 44 immediately below the discharge orifice 78 to provide an evaporating surface for the sample fluid. The sample wick may be simply cotton wrapped around the sample conduit. Alternatively, the sample wick may be asbestos wrapped around the sample conduit 44, a ceramic frit element or glass or any other suitable evaporating surface.

A radial bore 83 is formed in the wall of the main cylinder 14. This bore may be tapped to permit a solvent line or conduit to be connected thereto. The solvent conduit 84 is connected to a Y 86. The two sides of the Y are connected respectively to a solvent filling syringe 88 through a valve 90 and to a volume calibrate microsyringe 92 through a valve 94. The respective syringes again are of conventional types. The tips of the syringes may be insertable into receiving cups on the end of the respective conduits forming the Y 86 so that they may be replaced easily and quickly. Other conventional syringe coupling techniques may be employed.

The osmometer is used relatively simply. To begin with, a sample of a material such as a polymer, dissolved in a solvent, whose osmotic pressure is to be determined, is injected using the sample syringe 48 through the sample conduit 44. The sample is permitted to trickle down, over and through the sample wick 80. Any excess drains to the bottom of the chamber where it may be drained through the drain conduit 38. Next the outer chamber 72 is filled with a solvent for the polymer, which is the same used to place the polymer in solution, using the solvent syringe 88. The conical upper portion of the outer chamber 72 aids in flushing out bubbles from the chamber. During filling and flushing, the liquid bleed valve 66 of the pressure transducer may be opened to flush the entire system. The valve 66 is now closed so that the system is sealed and the differential pressure transducer 58 will now read relatively quickly the difference in pressure created by the evaporation of the solvent from the pores of the porous barrier 74 through the vapor gap provided by the inner chamber 70 until it again condenses on the sample wick 80. This solvent transfer from the pores of the porous barrier 74 to the wick 80 provides the difference in pressure which is sensed by the transducer and is significant in determining the molecular weight of the material in the sample.

Among the advantages of this invention, as thus far described, are the cylindrical structure of the porous barrier 74. It increases the surface area of the effective vapor gap between the wick and the barrier such that the speed of the determination is considerably increased. Furthermore, the vertical positioning of the wick aids in later rinsing the wick with a solvent after the osmotic pressure is determined.

In accordance with another embodiment of the invention the valve 68 to the source of gas pressure is opened to the source of gas pressure and the pressure regulator 66 adjusted to a desired pressure preferably above the ambient pressure existing within the chamber 70. This pressure is applied to the gas side of the pressure transducer as well as to the vapor gap which is in the chamber 70. With this increased pressure the solvent is retained more easily on the porous barrier 74 during filling and furthermore provides improved sensitivity of the osmometer because any trapped air bubbles in the solvent as well as any trapped air bubbles in the sample are compressed. By using a pressure differential of say 90 to 95 p.s.i., as would be the case where the solvent pressure were maintained at say 10 p.s.i. and the vapor gap is pressurized at 100 p.s.i., the bubble formation is considerably retarded. The limits of the high pressure operations available are limited only by the sealing and the strength of the materials used.

It will be obvious that various modifications may be made in the apparatus and in the manner of operating it. It is intended to cover such modifications and changes as would occur to those skilled in the art.

What is claimed is:

1. An instrument for determining osmotic pressure comprising:
    a body member having first and second chambers therein;
    an evaporating means disposed in said first chamber and adapted to receive a sample of a material whose osmotic pressure is desired, said second chamber adapted to contain a solvent for the sample material;
    a common barrier separating said first and second chambers, said common barrier being formed of a permeable member and configured in the shape of a vertically disposed hollow tube closed at its upper end, thereby to provide a vapor gap having a substantial surface area in said first chamber between said sample material and said solvent; and
    pressure sensing means adapted to sense the difference in pressure between said chambers, thereby to obtain an indication of the osmotic pressure of the material.

2. An instrument according to claim 1 which also includes means for adjusting the pressure in said first chamber, thereby to increase the sensitivity and efficiency of said instrument.

3. An instrument according to claim 2 wherein said pressure sensing means is a differential pressure transducer.

4. An instrument according to claim 2 wherein said evaporating means comprises a cylindrical wick vertically and coaxially disposed within said tube, thereby to facilitate rinsing said wick with said solvent.

5. An instrument according to claim 4 wherein said evaporating means also includes a vertically disposed sample injection tube passing upwardly through said wick, said tube having a discharge orifice adapted to inject said sample onto the upper portion of said wick.

6. An instrument according to claim 2 wherein said means for adjusting the pressure includes means for introducing a gas into said first chamber.

References Cited

UNITED STATES PATENTS

| | | | |
|---|---|---|---|
| 3,063,288 | 11/1962 | Reiff | 73—64.3 |
| 3,164,982 | 1/1965 | Pasternak et al. | 73—64.3 |
| 3,248,932 | 5/1966 | Bohrer | 73—64.3 |
| 3,318,138 | 5/1967 | Rolfson | 73—64.3 |

LOUIS R. PRINCE, Primary Examiner

JOSEPH W. ROSKOS, Assistant Examiner